United States Patent [19]

Mead

[11] Patent Number: 4,912,716
[45] Date of Patent: Mar. 27, 1990

[54] METHOD AND APPARATUS FOR FREQUENCY MODULATION STABILIZATION OF A LASER

[75] Inventor: Roy D. Mead, Seattle, Wash.

[73] Assignee: Spectra-Physics, Inc., San Jose, Calif.

[21] Appl. No.: 272,223

[22] Filed: Nov. 16, 1988

[51] Int. Cl.⁴ .............................................. H01S 3/13
[52] U.S. Cl. ...................................... 372/32; 372/18; 372/28; 372/92; 372/12; 372/13; 372/38
[58] Field of Search ................... 372/12, 32, 13, 18, 372/19, 20, 23, 30, 31, 25, 26, 28, 92, 38

[56] References Cited

U.S. PATENT DOCUMENTS

| | | | |
|---|---|---|---|
| 3,711,786 | 1/1973 | Vautier et al. | 372/32 |
| 4,398,293 | 8/1983 | Hall et al. | 372/32 |
| 4,468,773 | 8/1984 | Seaton | 372/32 |
| 4,660,206 | 4/1987 | Halmos et al. | 372/32 |
| 4,672,618 | 6/1987 | Wijnzjes et al. | 378/32 |

Primary Examiner—Léon Scott, Jr.
Attorney, Agent, or Firm—Seed and Berry

[57] ABSTRACT

A microwave oscillator frequency modulates the output of the laser system to be controlled. The modulated output passes through a molecular gas cell. The output of the molecular gas cell is detected by a square law device, which produces a signal at the desired microwave frequency only when a sideband of the modulated laser output coincides with the desired molecular transition frequency. A quadrature signal pair is produced by mixing the filtered output of the square law device with two phase-shifted signals from the microwave oscillator. The dispersion signal can be used to control the output frequency of the laser system, since its magnitude and sign are uniquely related to the required direction of correction.

22 Claims, 3 Drawing Sheets

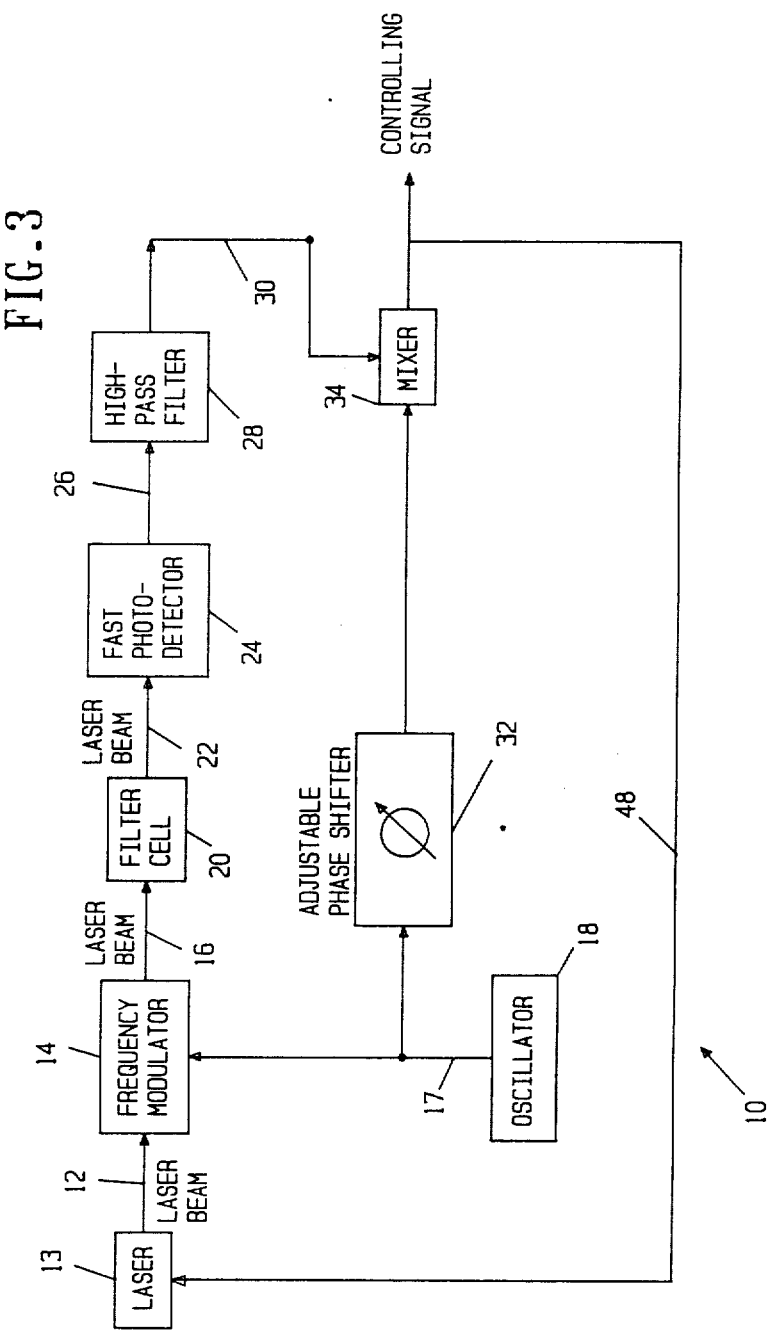

METHOD AND APPARATUS FOR FREQUENCY MODULATION STABILIZATION OF A LASER

DESCRIPTION

1. Technical Field

This invention is directed toward a method and apparatus for stabilizing the output of a laser, and more particularly, to a method and apparatus for stabilizing the output of a laser by frequency modulation.

2. Background of the Invention

Many laser applications require very precise stabilization of the output frequency of the laser. In some such applications, the laser is stabilized with respect to a reference that is not directly related to the reason for the stabilization. For example, in the case where a laser is to be stabilized with respect to a known molecular transition frequency, the laser is referenced with respect to a reference laser system, whose frequency is determined to very precisely follow the frequency of the desired molecular transition. In other instances, the output laser frequency can be controlled by an optical interferometer, wherein, for a fixed length, the interferometer produces a signal which is a function of the laser's output signal, the signal being used to control the output frequency of the laser.

The need to stabilize the output frequency of a laser to a known frequency occurs in the case of the need to minimize the interference due to the background noise. Such applications may require frequency accuracy better than one part in one million. One particular problem with such interferometer techniques is that the output light of the controlled laser must have uniform phase fronts.

In some applications in particular, it is desirable to lock the laser output frequency to a particular frequency of the transitions of an atom or molecule. As one example, for communication through sea water, it has been found that the cesium atom has a particular pair of transition frequencies occurring within a transitivity "window" of sea water. In this way, vehicles above the surface of the sea water can communicate to vehicles below the surface of the sea water. Generally, the narrowness of the atomic transition frequency reduces the amount of noise at the incorrect signal frequencies detected by the below-surface detection system. The cesium (Cs) resonance filter can filter the blue light reaching it below the surface of the sea, the blue light having already been filtered by a blue light filter. The cesium filter reemits any blue light that it absorbs as red light, the red light output can be interpreted as belonging to the cesium resonance filter by filtering the red light with a red filter and an IR filter. The output of the cesium resonant filter is then passed to a photo multiplier, which detects the existence of any energy at the frequency of interest.

One means of locking a laser to an atomic or molecular resonance utilizes a device similar to the aforementioned cesium resonance filter. The laser output frequency is regularly varied about some central value, while the red fluorescence from a cesium cell is observed. The central value is then adjusted to the frequency which appeared to yield the most intense fluorescence. Due to random variations in laser intensity and frequency, this method tends to be inefficient and leads to excessive frequency excursions of the controlled laser. While such frequency stabilization schemes work, they do not benefit from the production of a derivative signal having a sign which can be used to readily adjust the output frequency of the laser. Such schemes also do not allow stabilization of the laser at a frequency offset from the molecular resonant frequency.

It is, therefore, desirable to have a method and apparatus for stabilizing the output frequency of a laser system by frequency modulation, in such a way that the stabilization method or apparatus simply adjusts to the proper frequency.

DISCLOSURE OF THE INVENTION

It is an object of the present invention to provide a method and apparatus for stabilizing the output frequency of a laser system with respect to a molecular transition frequency.

It is another object of the present invention to provide a method and apparatus for stabilizing the output of a laser system through calculations of the dispersion signal of the output frequency.

It is still another object of the present invention to provide a method and apparatus for stabilizing the output frequency of a laser system by locking a sideband of a frequency-modulated laser onto the known transition frequency of a molecular transition.

According to one aspect, the invention provides an apparatus for stabilizing the output frequency of a laser at a desired output frequency. The desired output frequency is separated from a frequency of a first molecular transition of a substance having two molecular transitions by an adjustable offset frequency $f_m$. The apparatus comprises means for producing a signal containing the offset frequency $f_m$, means for modulating the output of the laser at the frequency $f_m$, and means for filtering the two molecular transition frequencies from the modulated laser output, the molecular transitions acting as a frequency reference. The apparatus further comprises means for detecting the output of the molecular transition frequency filtering means, means for producing a signed controlling signal indicative of the difference of the output frequency of the laser from the desired output frequency of the laser, and means for adjusting the output frequency of the laser based on the signed controlling signal.

According to another aspect of the present invention, the invention provides a method for stabilizing the output frequency of a laser at a desired frequency of a first molecular transition of a substance having two molecular transitions, the two transitions having a known frequency separation, $2f_m$. The method comprises the steps of (a) producing a signal containing the frequency $f_m$, (b) isolating the output of the laser at the frequency $f_m$, (c) filtering the two transition frequencies from the modulated laser output; and (d) detecting the output of the filtering means. The method further comprises the steps of (e) filtering the detected output, (f) producing a signal indicative of the dispersion of the output of the laser from the desired frequency of the molecular transitions, and (g) adjusting the output frequency of the laser based on the dispersion signal.

These and other objects of the present invention can be achieved by the method and apparatus for laser stabilization to be described in the following.

BRIEF DESCRIPTION OF THE DRAWINGS

FIG. 3 is a block diagram of a second embodiment for implementing the frequency modulation scheme of the present invention.

DETAILED DESCRIPTION OF THE INVENTION

Figure 1:
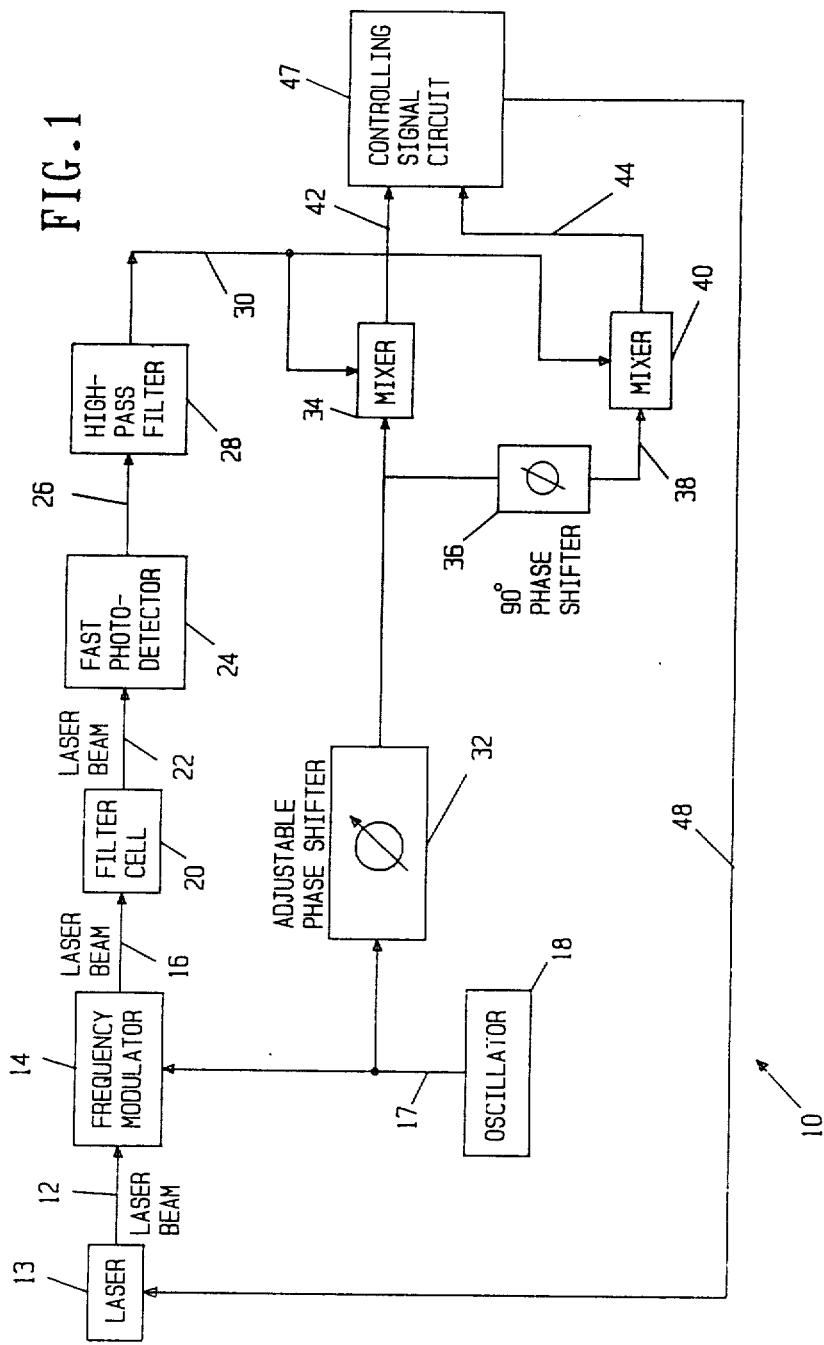
FIG. 1 is a block diagram of a first embodiment for implementing the frequency modulation scheme of the present invention.

The stabilization apparatus 10 shown in FIG. 1 receives the output beam 12 of a controllable laser system 13. The output beam 12 is received by a conventional frequency modulator 14 which provides an optical output beam 16 that has been modulated according to the frequency produced in signal 17 by a conventional oscillator 18. In preferred embodiments, the frequency modulator 14 can be an electro-optic or acousto-optic modulator. The oscillator 18 will preferably operate at microwave frequencies.

Figure 2:
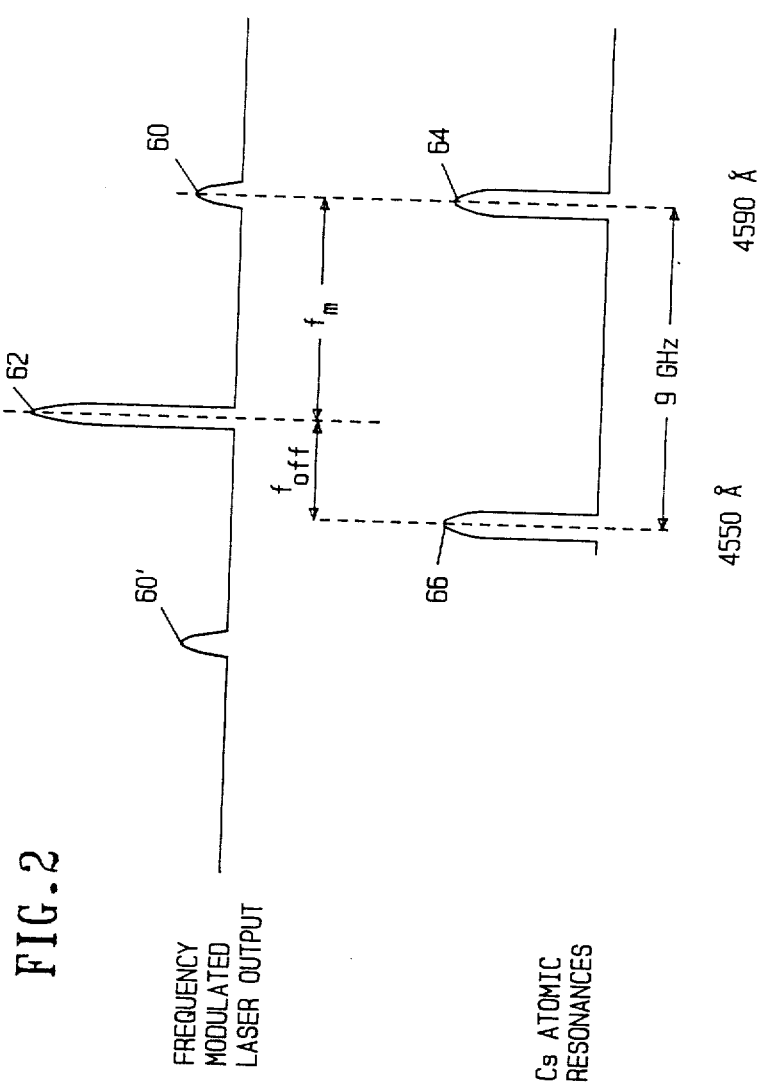
FIG. 2 is a graph of the resonances of a cesium cell and the frequency output of a frequency modulated laser.

The optical output beam 16 is then received by a filter cell 20 which responds to optical energy at frequencies corresponding to one or another of two molecular or atomic resonance frequencies. Hereinafter such molecular or atomic resonances will be referred to as molecular resonances, those skilled in the art recognizing that atomic resonances are similar to molecular resonances. The filter cell 20, for example, can be filled with cesium gas, which has resonant wavelengths of approximately 4550 and 4590 Angstroms, as shown in FIG. 2. These wavelengths are well within the transitivity "window" of sea water, and close to the window's maximum transitivity, at approximately 4800 Angstroms.

Alternatively, the filter cell 20 could be a beam of molecules issuing from an orifice, a solid containing absorbing molecules, or a solid with narrow absorptions due to defects in the solid. Each of these alternative filters can exhibit two closely spaced resonances.

The filter cell 20 will absorb components of the laser light output 16 at resonant frequencies that are determined by the molecular transitions of the particular filter cell 20, producing the filtered beam 22.

The laser light output 22 is received by a conventional fast photo-detector 24, which operates as a square-law device. The output of the photo-detector 24 contains DC components, and may contain microwave frequencies, depending upon the relationship of the modulation sidebands to the resonant frequencies of the molecular transitions, as discussed below.

As shown in FIG. 3, frequency modulation imposes sidebands 60 and 60' upon a carrier frequency 62 of the output beam 12. These sidebands have a significant intensity only at frequencies which are displaced from the laser carrier frequency 62 by plus or minus $f_m$. The phase of the product signal generated by the upper sideband beating against the carrier is opposite to the phase of the signal generated by the lower sideband beating against the carrier. Accordingly, if the frequency-modulated beam 16 were detected by a square law detector (such as fast photo-detector 24), only a DC signal would be observed. The reason is that the beat frequency between the upper sideband and the carrier cancels the beat between the lower sideband and the carrier.

If, however, one sideband is absorbed (as it is if the modulation frequency is chosen properly), the cancellation no longer occurs, and the signal at frequency $f_m$ is produced. Demodulation of the detector signal using a balanced modulator produces a DC signal proportional to the differential absorption of the sidebands.

The exact form of the signal obtained from the photodetector 24 may be derived mathematically. The electric field of a laser beam which is frequency modulated at frequency $f_m$ (angular frequency $\omega_m$) with modulation index $\beta \ll 1$ is the real part of $$E(t) = E_o \{\exp(i\omega_c t) + \beta/2 \exp[i(\omega_c + \omega_m)t] - \beta/2 \exp[i(\omega_c - \omega_m)t]\}$$

The filtering means 20 multiplies each component of this expression by separate factors $\exp(-\delta - \phi)$ by interacting with the carrier and sidebands of the modulated laser beam 16, where $\delta$ is the absorption of the filter medium and $\phi$ is its phase shift, or optical dispersion, at the wavelength of the carrier or sideband. There may also be nonresonant background absorption and phase shift $\delta_b$ and $\phi_b$ common to all frequency components of the beam 16, so the field of the filtered, modulated beam 22 is the real part of:

$$E(t) = E_o \exp(-\delta_b - i\phi_b) \{\exp(i\omega_c t) \exp(-\delta_c - i\phi_c) +$$
$$\beta/2 \exp[i(\omega_c + \omega_m)t] \exp(-\delta_u - i\phi_u) -$$
$$\beta/2 \exp[i(\omega_c - \omega_m)t] \exp(-\delta_\mu - i\phi_\mu)\}$$

The intensity detected at the square-law photodetector detector 24 is proportional to $|E(t)|^2$, or $$I(t) \alpha E^2_0 \exp(-2\delta_b)$$
$$\{1-(\delta_u-\delta_\mu)\beta\cos(\omega_m t)+(\phi_u+\phi_\mu-2\phi_c)\beta\sin(\omega_m t)\}$$

where the u, l, and c subscripts refer to the upper and lower sidebands and carrier, respectively, and $\delta_b$ is the background absorption of the filter 20.

According to this analysis, signals indicative of the differential absorption and dispersion of the filter 20 are available from the detector 24, and the phase of these signals differs by 90 degrees. The dispersion signal has the property of changing sign as the frequency of each component of the modulated laser shifts from less than the frequency of an absorption resonance of the filter 20 to greater than the frequency of the absorption resonance.

The high frequency components of the photodetector signal 26 are filtered by the high-pass filter 28 to produce a microwave signal 30. If desired, the high-pass filter 28 can be omitted.

The microwave signal 30 is mixed with two microwave signals derived from the signal 17, which is produced by the microwave oscillator 18. The frequency of the signal 17 produced by the microwave oscillator 18 is phase shifted by adjustable phase shifter 32. The signal produced by the adjustable phase shifter 32 is both mixed with the microwave signal 30 in the first mixer 34, and given an additional 90 degree phase shift in the 90 degree phase shifter 36. The microwave signal 38 produced by the 90 degree phase shifter 36 is also mixed with the microwave signal 30 in the second mixer 40.

The respective outputs 42 and 44 of the first and second mixers 34 and 40, respectively, constitute a quadrature signal pair 46. The signal pair 46 can be used by a controlling signal circuit 47 to derive a signed correction signal 48. The signed correction signal 48, which can be a dispersion signal, is representative of both any deviation between the desired frequency of the output beam 12 and the desired molecular transition frequency, and the direction of the deviation between the frequencies. An alternative embodiment is shown in FIG. 3, where a single mixer 34 is used. In this case the adjustable phase shifter 32 is adjusted so the desired dispersion signal is obtained from the mixer 34. All other components and signals in FIG. 3 are given the same reference numerals as they have in FIG. 1.

To illustrate, if wavelength control centered on the shorter-wavelength cesium hyperfine transition near 4590 Angstroms, as desired, the output wavelength of the laser system to be controlled will be adjusted so that the long-wavelength frequency modulation sideband will coincide with the longer wavelength 4590 Angstrom transition. This can be illustrated by comparing the graphs of FIG. 2, where the long-wavelength sideband 60 of the frequency modulated laser system carrier frequency 62 is chosen to coincide with the long-wavelength 4590 Angstrom transition 64. The microwave oscillator 18 (see FIG. 1) will determine the wavelength offset between the laser carrier frequency 62 and the long-wavelength transition frequency 64. Since the splitting of the two hyperfine components of the cesium atom is 9 GHz, a 9 GHz microwave oscillator frequency will place the laser carrier frequency 62 on the center of the shorter wavelength transition frequency 66. Variation of the microwave frequency in the range of 3 to 15 GHz, for example, causes a plus or minus 6 GHz offset from the line center of the shorter-wavelength transition frequency 66.

Locking the longer-wavelength $f_m$ sideband 60 to the longer-wavelength transition frequency 64 will present little difficulty, because the signed controlling (or dispersion) signal 48 can be detected from the quadrature signal pair 46. The dispersion signal 48 produced by the controlling signal circuit 47 changes sign as the frequency of the output of the laser system transits the center of the shorter-wavelength transition line 66. Accordingly, an unambiguous correction signal 48 is provided by the stabilization apparatus 10 (see FIG. 1).

Since the microwave frequency produced by the microwave oscillator 18 will be variable, spurious phase shifts between the path from the microwave oscillator 18 through the electro-optic frequency modulator 14 and the path from the microwave oscillator 18 through the adjustable phase shifter 32 can be matched. Additional compensation, if necessary may be done by subsequent processing of the demodulator outputs. There is a special case at a doppler correction of 4.5 GHz, where the two frequency modulation sidebands coincide with the two hyperfine transition frequencies (64 and 66), but this case can be handled with minor modifications to the stabilization apparatus 10.

In a second embodiment (see FIG. 3), the mixer 34 produces the signed controlling signal 48 from the output of the adjustable phase shifter 32 and the microwave signal 30. Components having the same function as their counterparts in FIG. 1 are given the same reference numbers in FIG. 1.

To summarize, the method and apparatus of the present invention have a number of advantages over other schemes for wavelength control. The wavelength is locked directly to the species of interest, such as the cesium atom. The method is relatively insensitive to beam quality variations, unlike wave meter methods whose accuracy and precision degrade rapidly with slight variations in beam characteristics. In addition, the method does not require an independent reference laser for frequency modulation control. The microwave electron is required for the method are not complex—in fact, highly developed, space qualifiable equipment already exists. Further, frequency-modulation spectroscopy is highly sensitive to resident absorptions, so a relatively cool cesium cell may be used, and the technique is insensitive to moderate amounts of window fogging. A simple single-channel photo diode 24 can be used to detect laser light after passing through the filter cell 20.

While the foregoing descriptions have been directed toward a particular embodiment of the present invention, those skilled in the art will recognize that modifications to the above-mentioned method and apparatus can be made without departing from the spirit and scope of the invention. Accordingly, the spirit and scope of the present invention are to be limited only by the following claims.

I claim:

1. Apparatus for stabilizing the output frequency of a laser at a desired output frequency, the desired output frequency being separated from a frequency of a first molecular transition of a substance having two molecular transitions by an adjustable offset frequency $f_m$, comprising:

means for producing a signal containing the offset frequency $f_m$;

means for modulating the output of the laser at the frequency $f_m$;

means for filtering the two molecular transition frequencies from the modulated laser output, said molecular transitions acting as a frequency reference;

means for detecting the output of the molecular transition frequency filtering means;

means for producing a signed controlling signal indicative of the difference of the output frequency of the laser from the desired output frequency of the laser; and means for adjusting the output frequency of the laser based on the signed controlling signal.

2. The apparatus of claim 1 wherein the modulating means produces a fixed frequency.

3. The apparatus of claim 1 wherein the modulating means produces an adjustable frequency.

4. The apparatus of claim 1 wherein the modulating means produces a frequency-modulated output.

5. The apparatus of claim 4 wherein the modulating means includes an electro-optic crystal connected to a stripline modulator.

6. The apparatus of claim 4 wherein the modulating means includes an electro-optic crystal contained in a microwave cavity.

7. The apparatus of claim 4 wherein the modulating means includes an acousto-optic crystal connected to a stripline modulator.

8. The apparatus of claim 4 wherein the modulating means includes an acousto-optic crystal contained in a microwave cavity.

9. The apparatus of claim 4 wherein the filtering means includes a beam of molecules issuing from an orifice.

10. The apparatus of claim 4 wherein the filtering means includes a solid containing absorbing molecules.

11. The apparatus of claim 1 wherein the filtering means comprises a cell containing one or more gases, said one or more gases having narrow absorption resonances.

12. The apparatus of claim 1 wherein the filtering means includes a solid containing defects that produce narrow absorptions.

13. The apparatus of claim 1 wherein the detecting means comprises a photodetector for generating an electrical signal from an optical electromagnetic field, said signal being a non-linear function of the amplitude of said electromagnetic field.

14. The apparatus of claim 1 wherein the means for producing the signed controlling signal comprises means for combining the signal produced by the detection means with the signal produced by the modulating means.

15. The apparatus of claim 14 wherein the means for producing the signed controlling signal further comprises means for phase-shifting the signal produced by the signal-combining means.

16. Apparatus for stabilizing the output frequency of a laser at a desired output frequency, the desired output frequency being separated from a frequency of a first molecular transition of a substance having two molecular transitions by an adjustable offset microwave frequency $f_m$, comprising:
   an oscillator for producing a signal containing the offset frequency $f_m$;
   a modulator connected to the laser and the oscillator for modulating the output of the laser at the frequency $f_m$;
   a filter cell for filtering the two molecular transition frequencies from the modulated laser output, said molecular transitions acting as a frequency reference;
   a photodetector for generating an electrical signal from the filtered modulated laser output, said signal being a non-linear function of the amplitude of the filtered modulated laser output;
   means for producing a signed controlling signal indicative of the difference of the output frequency of the laser from the desired output frequency of the laser; and
   means for adjusting the output frequency of the laser based on the signed controlling signal.

17. The apparatus of claim 16 wherein the means for producing the signed controlling signal comprises a first phase shifter for phase-shifting the output of the oscillator to produce a first phase-shifted signal and first means for mixing the first phase-shifted signal with the output of the photodetector to produce the signed controlling signal.

18. The apparatus of claim 16 wherein the means for producing the signed controlling signal comprises a first phase shifter for phase-shifting the output of the oscillator to produce a first phase-shifted signal and first means for mixing the first phase-shifted signal with the output of the photodetector to produce a first output signal, the means for producing the signed controlling signal further comprising a second phase shifter for phase-shifting the first phase-shifted signal to produce a second phase-shifted signal and second means for mixing the second phase-shifted signal with the output of the photodetector to produce a second output signal, the first and second output signals forming the signed controlling signal.

19. A method for stabilizing the output frequency of a laser at a desired output frequency, the desired output frequency being separated from a frequency of a first molecular transition of a substance having two molecular transitions by an adjustable offset frequency $f_m$, the method comprising the steps of:
   (a) producing a signal containing the offset frequency $f_m$;
   (b) modulating the output of the laser at the frequency $f_m$;
   (c) filtering the two molecular transition frequencies from the modulated laser output, said molecular transitions acting as a frequency reference;
   (d) detecting the filtered output of the modulated laser output to determine the output frequency of the laser;
   (e) producing a signed controlling signal indicative of the difference of the output frequency of the laser from the desired output frequency of the laser; and
   (f) adjusting the output frequency of the laser based on the signed controlling signal.

20. A method for stabilizing the output frequency of a laser at a desired output frequency, the desired output frequency being separated from a frequency of a first molecular transition of a substance having two molecular transitions by an adjustable offset microwave frequency $f_m$, the method comprising the steps of:
   (a) producing a signal containing the offset frequency $f_m$;
   (b) connecting a modulator to the laser and the oscillator;
   (c) modulating the output of the laser at the frequency $f_m$;
   (d) filtering the two molecular transition frequencies from the modulated laser output, said molecular transitions acting as a frequency reference;
   (e) generating an electrical signal from the non-linear function of the amplitude of the filtered modulated laser output;
   (f) producing a signed controlling signal indicative of the difference of the output frequency of the laser from the desired output frequency of the laser; and
   (g) adjusting the output frequency of the laser based on the signed controlling signal.

21. The method of claim 20 wherein step (f) includes:
   (f1) phase-shifting the output of the oscillator to produce a first phase-shifted signal; and
   (f2) mixing the first phase-shifted signal with the output of the photodetector to produce the signed controlling signal.

22. The method of claim 20 wherein step (f) includes:
   (f1) phase-shifting the output of the oscillator to produce a first phase-shifted signal;
   (f2) mixing the first phase-shifted signal with the output of the photodetector to produce a first output signal;
   (f3) phase-shifting the first phase-shifted signal to produce a second phase-shifted signal;
   (f4) mixing the second phase-shifted signal with the output of the photodetector to produce a second output signal; and
   (f5) forming the signed controlling signal from the first output signal and the second output signal.

* * * * *

UNITED STATES PATENT AND TRADEMARK OFFICE
CERTIFICATE OF CORRECTION

PATENT NO. : 4,912,716
DATED : March 27, 1990
INVENTOR(S) : Roy D. Mead

It is certified that error appears in the above-identified patent and that said Letters Patent is hereby corrected as shown below:

In claim 20, column 8, line 39, following "from the" insert --filtered modulated laser output, said signal being a--.

Signed and Sealed this

Third Day of September, 1991

Attest:

Attesting Officer

HARRY F. MANBECK, JR.

Commissioner of Patents and Trademarks